Patented July 14, 1942

2,289,886

UNITED STATES PATENT OFFICE 2,289,886

PRODUCTION OF PHENOLS

Louis Schmerling, Chicago, Ill., assignor to Universal Oil Products Company, Chicago, Ill., a corporation of Delaware No Drawing. Application May 17, 1939, Serial No. 274,134

9 Claims. (Cl. 260—621)

This invention relates to an improved method of producing phenols and alkylated phenols. More particularly it refers to a process for de-etherizing alkyl phenyl ethers with the resultant production of phenols and alkylated phenols which are useful as dye intermediates, germicides, insecticides, oxidation inhibitors, etc.

Known methods of converting alkyl phenyl ethers into phenols comprise the treatment of such ethers with hydrogen chloride, bromide, or iodide whereby the alkyl group is removed in the form of an alkyl halide which is so stable under the operating conditions employed that rather troublesome and expensive methods are required for decomposing said alkyl halide and recovering hydrogen halide to be recycled to further use. According to this invention in which hydrogen fluoride is employed for so treating alkyl aryl ethers, alkyl fluorides which may be formed intermediately decompose readily in the presence of the remaining hydrogen fluoride and regenerate hydrogen fluoride. In the end, the products of the reaction are substantially free from alkyl fluorides. If olefins form simultaneously from such decomposing alkyl fluorides, these may be consumed through reaction with phenols forming alkylated phenols, or they may polymerize under the influence of the hydrogen fluoride catalysts.

It is also known that mixtures of sulfuric and acetic acids are effective in converting alkyl phenyl ethers into alkylated phenols only when the alkyl side chain has a secondary or tertiary structure. The process of the present invention is applicable to secondary and tertiary alkyl phenyl ethers and also to primary alkyl phenyl ethers, the latter being substances which undergo substantially no de-etherization in the presence of mixtures of sulfuric and acetic acids.

In one specific embodiment the present invention comprises a process for the production of phenols and alkylated phenols which consists in contacting alkyl-aryl ethers with hydrogen fluoride at a temperature in the approximate range of 50–200° C.

Alkyl-aryl ethers which may be treated by the process of this invention for the production of phenolic materials herein referred to as phenols include anisole, phenetole, and the different propyl, butyl, and amyl phenyl ethers,—the formation of which is frequently unavoidable during alkylation of phenols by olefins in the presence of certain catalysts; certain ethers of poly phenols, such as veratrol and guaiacol, the latter a constituent of the creosote obtained from beechwood tar; and other ethers in which the term aryl group comprises various polynuclear aromatic hydrocarbon radicals.

During the alkylation of phenols by olefins or alcohols in the presence of acid catalysts there is considerable formation of alkyl-aryl ethers. Thus the reaction of phenol with ethyl alcohol in the presence of phosphoric acid at 225° C. produced a 58–78% combined yield of phenetole, ortho- and para-ethyl phenetoles and more highly ethylated phenetole. The well known treatment with hydrogen iodide converts these phenetoles into phenol, alkylated phenols, and alkyl iodides. The present invention effects continuous de-etherization to phenols with greater ease and efficiency than does the employment of hydrogen iodide. Thus substantially anhydrous hydrogen fluoride, or this material containing minor proportions of water, may be used as catalyst for de-etherizing alkyl-phenyl ethers according to the present invention.

The process of the invention may be carried out in a number of ways. In batch operation an alkyl aryl ether and hydrogen fluoride are heated together at a temperature in the approximate range of 50–200° C. under a pressure in the order of atmospheric to approximately 25 atmospheres for a time upward to eight hours, the exact period depending upon the ease of de-etherization of the substance concerned. Generally a shorter time of contact is necessary to effect the desired reaction at the higher temperatures in the specified range. In most cases the alkoxy group is converted into a hydroxyl group and the alkyl group so liberated, and perhaps existing transitorily as alkyl fluoride, is added to the aryl nucleus to form an alkylated phenol. After such treatment, the reaction products, which are generally substantially free from alkyl fluorides, are separated from the hydrogen fluoride catalyst which may be utilized in subsequent de-etherization work. From the resultant mixture of phenols and unconverted alkyl aryl ether, the phenols may be separated by suitable means, such as by extraction with caustic soda solution and the recovered unconverted alkyl phenyl ethers may be recycled to further interaction with hydrogen fluoride. Acidification of the alkali extract liberates therefrom the phenols formed by the de-etherization.

The process of this invention may be operated continuously under approximately the same temperature and pressure conditions utilized for batch operation by passing a mixture of alkyl phenyl ether and hydrogen fluoride through a suitable tubular heater, after which the hydrogen fluoride is recovered and recycled and the phenolic material is separated from unchanged alkyl phenyl ether by suitable means, such as by alkali extraction. The ethers remaining after such extraction treatment are recycled to further continuous de-etherization treatment. Generally, continuous operation of the process of this invention is preferred over batch operation because of the greater ease of controlling the time of contact with the catalyst and accordingly the degree of de-etherization and alkylation effected.

While the reactions occurring during the process of this invention are not understood clearly or completely, the changes occurring apparently proceed in two steps. In the first step an alkyl phenyl ether apparently reacts with hydrogen fluoride producing a phenol and an alkyl fluoride as indicated by the following equation:

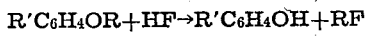
$$R'C_6H_4OR + HF \rightarrow R'C_6H_4OH + RF$$

In the second step, also in the presence of hydrogen fluoride, the alkyl fluoride so formed may undergo reaction with the phenol liberated in the first step producing an alkylated phenol as illustrated by the following equation:

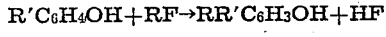
$$R'C_6H_4OH + RF \rightarrow RR'C_6H_3OH + HF$$

Thus nuclear alkylation occurs accompanied by regeneration of the hydrogen fluoride catalyst. There also exists the possibility that alkyl fluoride formed in the first step of the reaction may react with unconverted alkyl phenyl ether so as to produce a further alkylated alkyl phenyl ether as illustrated by the following equation:

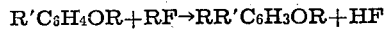
$$R'C_6H_4OR + RF \rightarrow RR'C_6H_3OR + HF$$

Such alkylated alkyl phenyl ether may subsequently undergo de-etherization in the presence of hydrogen fluoride to produce a di-alkylated phenol which may be similar to that formed by steps one and two. However, these mechanistic concepts should not be misconstrued to limit the broad scope of the invention.

While the process of this invention is preferably carried out under a pressure upward to 25 atmospheres, super-atmospheric pressures are not necessarily indispensable as it is possible to effect good conversion into alkyl phenols under atmospheric pressure. It is not to be inferred, however, that operation under these alternative conditions will necessarily produce identical results in regard to the extent of de-etherization or accompanying alkylation. In general, the choice of operating conditions is governed by the reactivity of the alkyl-aryl ether undergoing treatment and the nature of the resultant phenolic products.

The following examples are given to indicate typical results obtainable in the operation of the process, although not with the intention of unduly limiting the generally broad scope of the invention:

Example 1

A mixture of 540 parts by weight of phenetole and 250 parts by weight of anhydrous hydrogen fluoride was heated at 60° C. for 8 hours in a copper lined rotating autoclave. After the reaction, hydrogen fluoride was allowed to evaporate from the liquid product which was then washed with water, dissolved in ether, and the ether solution extracted by dilute alkali. The alkaline solution was acidified and the liberated phenol was separated from the aqueous solution by ether extraction. Evaporation of the ether yielded 8% of alkali soluble material consisting chiefly of phenol.

Example 2

A mixture of the same quantities of phenetole and hydrogen fluoride as used in Example 1 was heated similarly for 8 hours at 100° C. Investigation of the products by the methods indicated in Example 1 showed that 44% of the alkyl phenyl ether had been converted into phenolic materials totalling 280 parts by weight obtained from 540 parts by weight of phenetole. Distillation of the phenolic products of the reaction yielded 105 parts by weight of phenol, 66 parts by weight of ethylphenol (chiefly ortho-ethyl phenol), and 10 parts by weight of higher boiling phenols.

Distillation of the alkali insoluble material which represented alkyl phenyl ethers which escaped deetherization showed that besides phenetole it contained 56 parts by weight of ethyl phenetole and 52 parts by weight of higher boiling material.

Similar results are obtainable by substituting anisole and guaiacol for the phenetole in the above examples.

The character of the process of the present invention and particularly its commercial value are evident from the preceding specification and numerical data presented, although neither section is intended to unduly limit its generally broad scope.

I claim as my invention:

1. A process for the production of phenols which comprises subjecting alkyl-aryl ethers to the de-etherizing action of hydrogen fluoride.

2. A process for the production of phenols which comprises contacting alkyl-aryl ethers with hydrogen fluoride at a temperature from about 50° C. to about 200° C.

3. A process for the production of phenols which comprises contacting alkyl-aryl ethers with hydrogen fluoride at a temperature from about 50° C. to about 200° C. under a pressure in the range of atmospheric to approximately 25 atmospheres.

4. A continuous process for the production of phenols which comprises subjecting alkyl-aryl ethers to the de-etherizing action of hydrogen fluoride, recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction under substantially the same conditions as those obtaining during the first cycle of the process.

5. A continuous process for the production of phenols which comprises contacting alkyl-aryl ethers with hydrogen fluoride at a temperature from about 50° C. to about 200° C., recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction at a temperature from about 50° C. to about 200° C.

6. A continuous process for the production of phenols which comprises contacting alkyl-aryl ethers with hydrogen fluoride at a temperature from about 50° C. to about 200° C. under a pressure in the range of atmospheric to approximately 25 atmospheres, recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction under substantially the same conditions as those obtaining during the first cycle of the process.

7. A continuous process for the production of phenols which comprises contacting anisole with hydrogen fluoride at a temperature from about 50° C. to about 200° C. under a pressure in the range of atmospheric to approximately 25 atmospheres, recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction under substantially the same conditions as those obtaining during the first cycle of the process.

8. A continuous process for the production of phenols which comprises contacting phenetole with hydrogen fluoride at a temperature from about 50° C. to about 200° C. under a pressure in the range of atmospheric to approximately 25 atmospheres, recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction under substantially the same conditions as those obtaining during the first cycle of the process.

9. A continuous process for the production of phenols which comprises contacting guaiacol with hydrogen fluoride at a temperature from about 50° C. to about 200° C. under a pressure in the range of atmospheric to approximately 25 atmospheres, recovering hydrogen fluoride from the treated products, separating phenols from the latter by extraction with alkali, liberating and recovering phenols from said alkali extract, and subjecting the unconverted alkali insoluble material and recovered hydrogen fluoride to further interaction under substantially the same conditions as those obtaining during the first cycle of the process.

LOUIS SCHMERLING.